June 12, 1934.   W. J. BRETH   1,963,013
TUBE SPLICING MACHINE
Filed March 3, 1932   2 Sheets-Sheet 1

INVENTOR
W. J. Breth
BY
Evans + McCoy
His ATTORNEYS

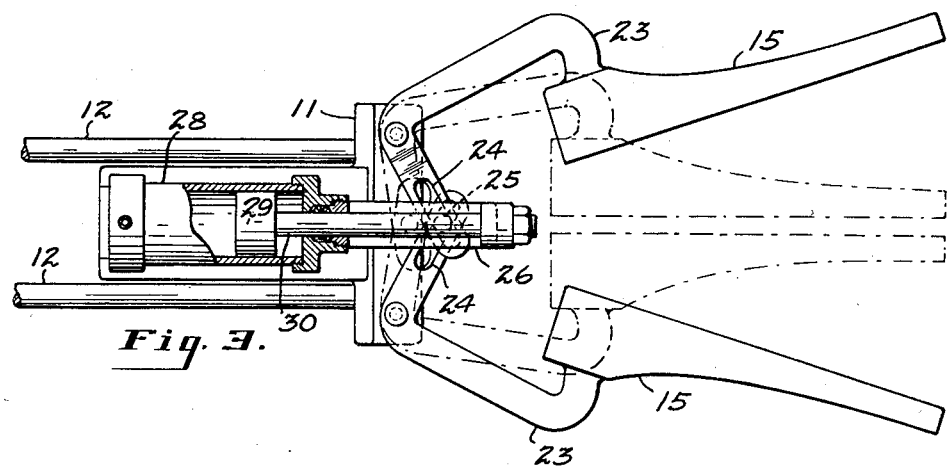
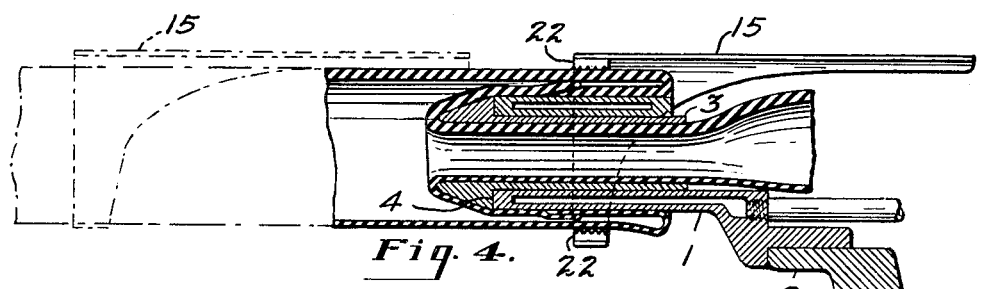
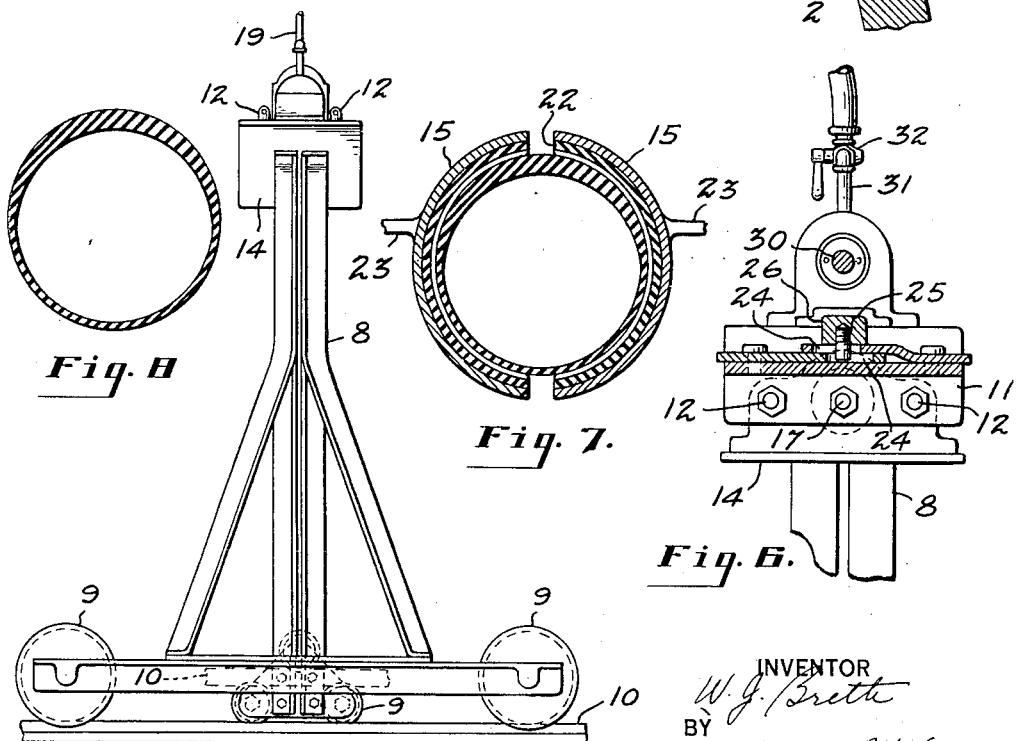

Patented June 12, 1934

1,963,013

UNITED STATES PATENT OFFICE

1,963,013

TUBE SPLICING MACHINE

Walter J. Breth, Akron, Ohio, assignor to The General Tire & Rubber Company, Akron, Ohio, a corporation of Ohio Application March 3, 1932, Serial No. 596,500

11 Claims. (Cl. 18—18)

This invention relates to apparatus for use in splicing and vulcanizing the splice of pneumatic tire inner tubes and it is one of the objects of the present invention to provide new and improved apparatus of such construction that inner tubes and particularly heavy tubes may be quickly spliced and vulcanized.

Another object is to provide inner tube vulcanizing apparatus of simplified construction for quickly and easily placing a spliced inner tube into vulcanizing position.

Another object is to provide inner tube vulcanizing apparatus with a vulcanizing mandrel and a simplified shifting device for telescoping portions of the inner tube adjacent the splice with the vulcanizing mandrel.

A further object is to provide a vulcanizing mandrel for inner tubes with a gripping means for quickly telescoping the tube within itself and over the mandrel into a position over the mandrel whereby the spliced ends of the tube may be vulcanized to complete the splice.

With the above and other objects in view, which will be apparent from the following detailed description, the present invention consists in certain features of construction and combinations of parts which will be readily understood by those skilled in the art to which the invention appertains.

In the drawings, which illustrate one suitable embodiment of the invention about to be described, Figure 1 is a side elevation of the splicing and vulcanizing apparatus, an inner tube to have the splice vulcanized being mounted within what may be termed for the convenience of description, a vulcanizing mandrel, and in a position to be doubled over the mandrel;

Fig. 3 is an enlarged plan view of the tube doubling device;

Fig. 4 is an enlarged section taken substantially on the line 4—4 of Fig. 2 but showing the tube doubling device in its operative position;

Fig. 5 is a rear elevation of the apparatus shown in Figs. 1 and 2;

Fig. 6 is a section taken substantially on the line 6—6 of Figure 1;

Fig. 7 is an enlarged section taken substantially on the line 7—7 of Fig. 1; and Fig. 8 is an enlarged transverse section of one type of pneumatic tire inner tube for which the apparatus of the present invention is particularly adaptable.

Figure 1:
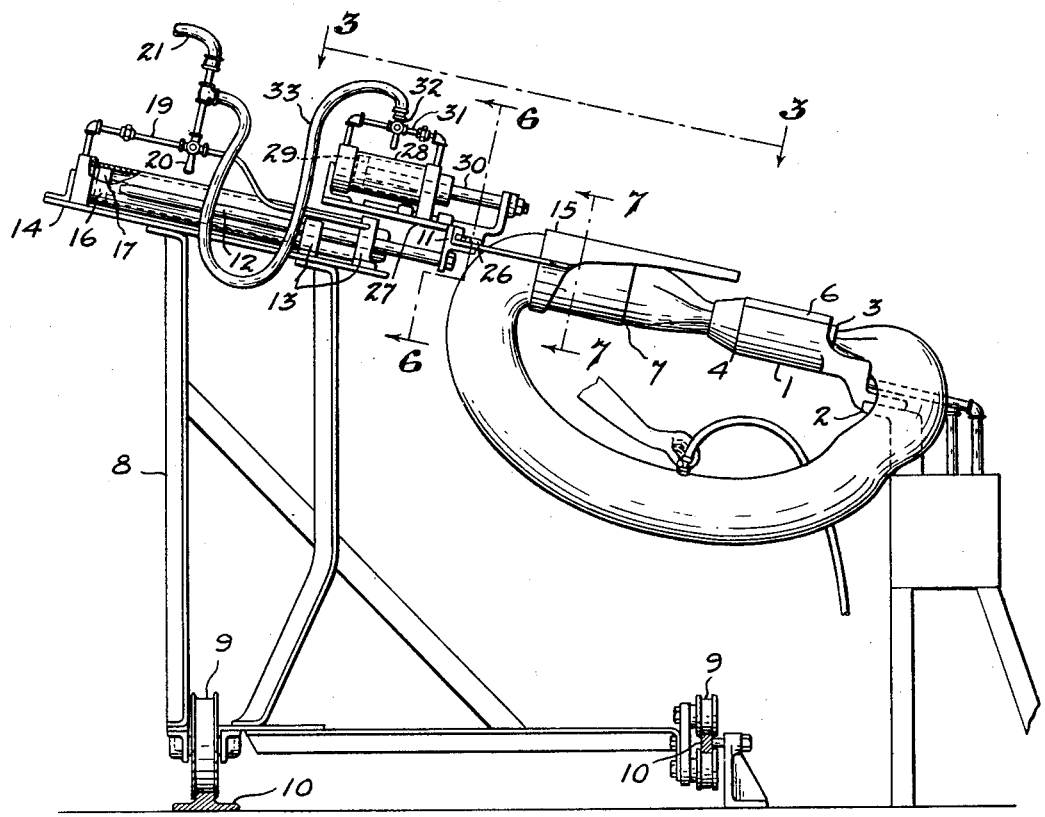

The apparatus of the present invention is more particularly adapted to inner tubes such as the one shown in cross-section in Fig. 8, wherein that portion of the tube which directly underlies the tread portion of the tire casing is of a thickness materially greater than the remaining portions of the tubes. It has been found through experience that tubes of such description are very difficult to manipulate in vulcanizing inner tube splices, and that by using the apparatus of the present invention such tubes may be very quickly and easily manipulated and that a single device may be used for a battery of vulcanizers.

Referring to the accompanying drawings, in which like numerals refer to like parts throughout the several views, the splice vulcanizer shown is of a conventional type comprising an annular body 1 that is supported in a projecting manner from a support 2, the outer surface thereof being circular and approximately the same diameter as the outer diameter of the tube which is to have its splice vulcanized. A two-part annular sleeve 3 is fitted within the vulcanizer body 1, the rearward end of which, as viewed in Fig. 4, is formed with a shoulder 4 abutting against the end of the body 1 and which is frusto-conical in shape as shown in Fig. 4, in order that the tube may be folded back upon itself over the body 1. The body 1 is formed with a longitudinal slot 5 extending throughout its length, in order that the tube A as illustrated may be positioned to lie within the body 1 and the parts of the sleeve 3 disposed about the tube and within the body 1, as shown in Figs. 4 and 7. The slot 5 of the body 1, after the tube is in position, is closed by a removable key or filler portion 6, in order that a continuous circumferential surface may be presented to the tube to be vulcanized. The ends of the tube A, of course, are telescoped and overlapped with each other, as indicated by the overlap indicated by the numeral 7 of Fig. 1.

Figure 2:
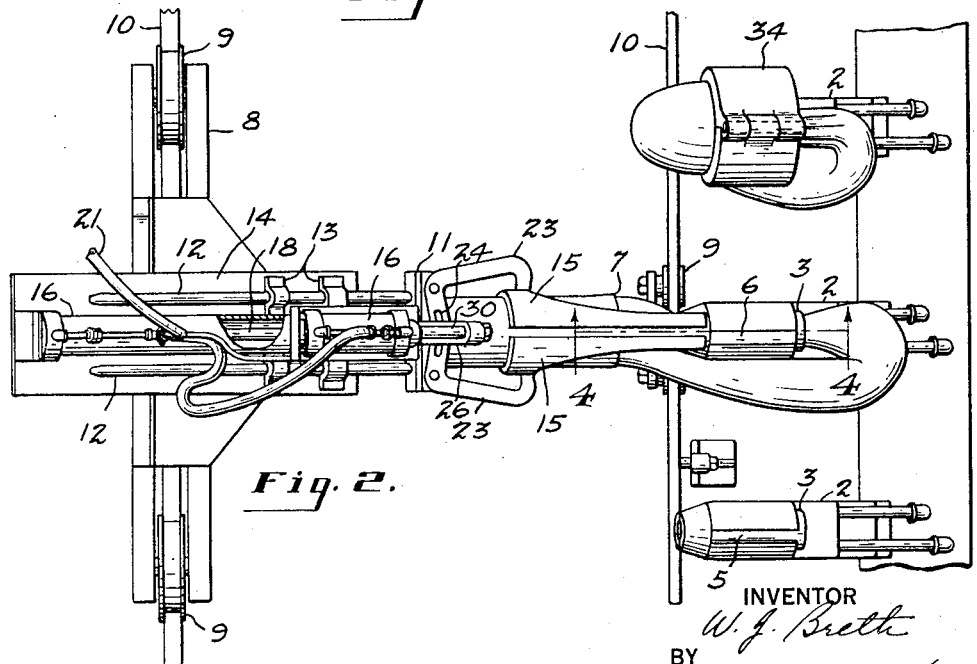
Fig. 2 is a plan view of the apparatus shown in Fig. 1, illustrating a single means for use with a number of vulcanizing mandrels.

It is preferable to employ a battery of vulcanizers as shown in Fig. 2 and to use a single tube doubling device for the battery as shown in Fig. 2. For this reason the apparatus about to be described is mounted upon a standard 8, which is mounted for movement on rollers 9 that are guided in any suitable manner over a pair of spaced tracks 10, so that the apparatus may be moved to any one of the battery of vulcanizers.

The doubling apparatus comprises a movable support 11 rigidly secured to a pair of spaced slide or guide rods 12 which are slidably mounted in slide brackets 13 secured to a standard base 14, a pair of spaced grippers 15 pivoted to the support 11, means for pivoting the grippers 15 and means for moving the support 11 and attached grippers longitudinally of the vulcanizer body 1.

The means for moving the support 11 preferably comprises a pneumatic cylinder 16 rigidly secured to the base 14 and a suitable plunger 17 having a plunger rod 18 that is attached to the support 11. The plunger 17 is pneumatically operated from one end of the cylinder to the other by alternately admitting fluid under pressure to opposite ends of the cylinder 16 through a conduit 19 having a three-way valve 20 that is connected to a fluid supply conduit 21.

The grippers 15 comprise a pair of longitudinal arms, each carrying at its innermost end a sime-circular element 22 of rubber or some suitable friction material which is ribbed to provide a friction surface, the radius of the elements 22 being slightly greater than the radius of the inner tube, in order that the elements 22 may, during operation, be disposed about the body 1 with the walls of the tube doubled therebetween. The gripper arms are mounted on the outer ends of right-angled brackets 23, which are pivoted intermediate their ends to the support 11. The inner ends of these brackets 23 overlap each other and are formed with elongated slots 24, through which an actuating pin 25 extends. The actuating pin 25 is carried by a sliding plate 26 which is slidably guided in a rearwardly extending portion 27 of the support 11. The portion 27 carries a pneumatic cylinder 28 which contains a plunger 29 that is provided with a plunger rod 30 connected with the support 11, as shown in Fig. 1. Fluid under pressure is alternately admitted to the opposite ends of the cylinder 28 to actuate the plunger 29, through a conduit 31 that is in communication with a three-way valve 32 to a flexible supply conduit 33, the conduit 33 being in communication with the main supply conduit 21.

In the operation of the apparatus described, the tube A having its ends telescoped within each other is positioned within the body 1 through the slot 5, the filler portion 6 then being dropped in place, and the two-part sleeve is placed about the tube and telescoped within the body 1. The grippers 15 are in their retracted position, as shown in Fig. 1, and the tube is positioned to lie between the grippers 15, the splice indicated at 7 being arranged at some distance away from the vulcanizer body. The three-way valve 32 is turned to admit fluid under pressure into the forward end of the cylinder 28 as viewed in Fig. 1, which causes the plunger 29 to move the actuating pin rearwardly and thereby move the grippers 15 from their inoperative position shown in Fig. 3 to their operative gripping position shown in Figs. 2 and 4.

The tube A is next inflated, which causes the walls thereof to expand outwardly into firm contact with the gripper elements 22 which are preferably of ribbed and resilient friction material, such as rubber.

The next step consists in disposing the splice over the vulcanizer mandrel or body 1 and, in order to do this, the three-way valve 20 is turned to admit fluid under pressure into the rearward end of the cylinder 16 as viewed in Fig. 1, which causes the plunger 17 to move the support 11 forwardly toward the vulcanizer body 1. During this forward movement, the tube, since it is securely gripped by the elements 22 and because of the frusto-conical end of the sleeve 3, is actually folded back upon itself over the body 1 of the vulcanizer with the splice portion of the tube disposed around the body 1 of the vulcanizer, as shown in Fig. 4. The grippers may then be released and retracted, and the tube suitably clamped around the vulcanizer body 1 for the vulcanizing operation by means of a clamp 34.

During the vulcanizing operation, the tube doubling device may be employed to position another tube in vulcanizing position on one of the other vulcanizers comprising the battery.

The reverse operation of the device may be used to remove the tube from the vulcanizer body 1 or, if desired, the tube may be removed by hand.

The relatively long portions of the grippers which, in their inoperative position slightly extend over the vulcanizer body 1, assist materially in preventing undesired distortion of the tube while the tube is being doubled over the vulcanizer body 1.

It is understood, of course, that a suitable rubber cement, or other vulcanizable material, is applied between the overlapped ends of the tube before they are spliced in order that the splice will be properly vulcanized.

The advantages of the device described are clearly apparent and it can be seen that inner tubes and particularly those having heavy walls and walls of uneven thickness such as the tube described may be quickly and easily disposed over the vulcanizer body.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. In an apparatus for vulcanizing inner tube splices, an annular vulcanizer body having a circular vulcanizing surface and arranged to receive an inner tube within its walls with the splice of the tube in advance of said body, gripping means having semi-circular gripping elements for gripping the tube in advance of the splice, and means to move said gripping means longitudinally of said body and to a position concentric therewith to force the tube over said body with the splice circumscribing and in contact with said vulcanizing surface.

2. In an apparatus for vulcanizing inner tube splices, an annular vulcanizer body having a circular vulcanizing surface and arranged to receive an inner tube within its walls with the splice of the tube in advance of said body, gripping means having semi-circular gripping elements of friction material for gripping the tube in advance of the splice, and means to move said gripping means longitudinally of said body and to a position concentric therewith to force the tube over said body with the splice circumscribing and in contact with said vulcanizing surface.

3. In an apparatus for vulcanizing inner tube splices, an annular vulcanizer body having a circular vulcanizing surface and arranged to receive an inner tube within its walls with the splice of the tube in advance of said body, a pair of grippers having semi-circular gripping elements, means for moving said grippers into gripping engagement with said tube in advance of the splice therein, and means to move said gripping means longitudinally of said body and to a position concentric therewith to double the tube upon itself around said body with the splice circumscribing and in contact with said vulcanizing surface.

4. In an apparatus for vulcanizing inner tube splices, an annular vulcanizer body having a circular vulcanizing surface and arranged to receive an inner tube within its walls with the splice of the tube in advance of said body, gripping means having semi-circular gripping elements of friction material for gripping the tube in advance of the splice, and means to move said gripping means longitudinally of said body and to a position concentric therewith to force the tube over said body with the splice circumscribing and in contact with said vulcanizing surface.

5. In an apparatus for vulcanizing inner tube splices, an annular vulcanizer body having a circular vulcanizing surface and arranged to receive an inner tube within its walls with the splice of the tube in advance of said body, a pair of grippers having semi-circular gripping elements, means for moving said grippers into gripping engagement with said tube in advance of the splice therein, and means to move said gripping means longitudinally of said body and to a position concentric therewith to double the tube upon itself around said body with the splice circumscribing and in contact with said vulcanizing surface, said grippers including portions normally projecting over said body to prevent undue distortion of the tube during movement of said grippers relative to said body.

6. In an apparatus for vulcanizing inner tube splices, an annular vulcanizer body having a circular vulcanizing surface and arranged to receive an inner tube within its walls with the splice of the tube in advance of said body, a movable support, a pair of grippers pivoted to said support, means for moving said grippers into gripping position about said tube, said grippers in said gripping position being coaxial with said body, and means for moving said support toward said body whereby said grippers will circumscribe said body and double the tube over said body with the splice thereof in contact with said vulcanizing surface.

7. In an apparatus for vulcanizing inner tube splices, an annular vulcanizer body having a circular vulcanizing surface and arranged to receive an inner tube within its walls with the splice of the tube in advance of said body, a movable support, a pair of grippers pivoted to said support, means for moving said grippers into gripping position about said tube, said grippers in said gripping position being coaxial with said body, and means for moving said support toward said body whereby said grippers will circumscribe said body and double the tube over said body with the splice thereof in contact with said vulcanizing surface, said grippers having projecting means overlying said body to prevent undue distortion of the tube during movement of said grippers relative to said body.

8. In an apparatus for vulcanizing inner tube splices, an annular vulcanizer body having a circular vulcanizing surface and arranged to receive an inner tube within its walls with the splice of the tube in advance of said body, a movable support, a pair of grippers pivoted to said support, each gripper including a friction gripping element, means for moving said grippers into gripping position about said tube, said grippers in said gripping position being coaxial with said body, and means for moving said support toward said body whereby said grippers will circumscribe said body and double the tube over said body with the splice thereof in contact with said vulcanizing surface.

9. In an apparatus for vulcanizing inner tube splices, an annular vulcanizer body having a circular vulcanizing surface and arranged to receive an inner tube within its walls with the splice of the tube in advance of said body, a movable support, a pair of grippers pivoted to said support, pneumatic means for moving said grippers into gripping position about said tube, said grippers in said gripping position being coaxial with said body, and means for moving said support toward said body whereby said grippers will circumscribe said body and double the tube over said body with the splice thereof in contact with said vulcanizing surface.

10. In an apparatus for vulcanizing inner tube splices, an annular vulcanizer body having a circular vulcanizing surface and arranged to receive an inner tube within its walls with the splice of the tube in advance of said body, a movable support, a pair of grippers pivoted to said support, means for moving said grippers into gripping position about said tube, said grippers in said gripping position being coaxial with said body, and pneumatic means for moving said support toward said body whereby said grippers will circumscribe said body and double the tube over said body with the splice thereof in contact with said vulcanizing surface.

11. In an apparatus for vulcanizing inner tube splices, an annular vulcanizer body having a circular vulcanizing surface and arranged to receive an inner tube within its walls with the splice of the tube in advance of said body, a movable support, a pair of grippers pivoted to said support, pneumatic means for moving said grippers into gripping position about said tube, said grippers in said gripping position being coaxial with said body, and pneumatic means for moving said support toward said body whereby said grippers will circumscribe said body and double the tube over said body with the splice thereof in contact with said vulcanizing surface.

WALTER J. BRETH.